United States Patent
Joseph et al.

(10) Patent No.: US 10,115,214 B2
(45) Date of Patent: Oct. 30, 2018

(54) SHARED DATA SPLITTING INTERFACE

(71) Applicant: Verizon Patent and Licensing Inc., Arlington, VA (US)

(72) Inventors: Peter Joseph, Kerala (IN); Ashfaq Shakir, Chennai (IN); Balamurugan Natarajan, Coimbatore (IN); Amisha Banker, Mumbai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 150 days.

(21) Appl. No.: 14/930,705

(22) Filed: Nov. 3, 2015

(65) Prior Publication Data

US 2017/0124737 A1    May 4, 2017

(51) Int. Cl.
*G06T 3/40*   (2006.01)
*G06T 11/20*   (2006.01)
*G06F 3/0484*   (2013.01)

(52) U.S. Cl.
CPC ........ *G06T 11/206* (2013.01); *G06F 3/04842* (2013.01)

(58) Field of Classification Search
CPC .................................................... G06T 11/206
See application file for complete search history.

(56) References Cited

U.S. PATENT DOCUMENTS

| | | | |
|---|---|---|---|
| 2006/0048064 A1* | 3/2006 | Vronay | G06F 9/451 715/764 |
| 2010/0031157 A1* | 2/2010 | Neer | G06Q 10/06 715/738 |
| 2014/0359710 A1* | 12/2014 | Chaput | H04M 15/67 726/4 |
| 2015/0172216 A1* | 6/2015 | Bellizia | H04L 47/72 709/226 |
| 2015/0379447 A1* | 12/2015 | Katkar | G06Q 10/063118 705/7.17 |
| 2016/0212506 A1* | 7/2016 | Norwood | H04Q 9/00 |

* cited by examiner

*Primary Examiner* — Phi Hoang

(57) ABSTRACT

A method includes accessing a total data allocation and data allocation information associated with each of a plurality of members of a shared data plan and rendering a shared data splitting interface. The shared data splitting interface includes a radial distribution component and differentiated visual segments of the radial distribution component. The method includes receiving a change in the data allocation information for a particular one of the plurality of members of the shared data plan, and adjusting a size of a particular differentiated visual segment for the particular one of the plurality of members of the shared data plan based on the change. The method also includes adjusting the relative sizes of others of differentiated visual segments based on the change in the data allocation information for the particular one of the plurality of members of the shared data plan.

20 Claims, 8 Drawing Sheets

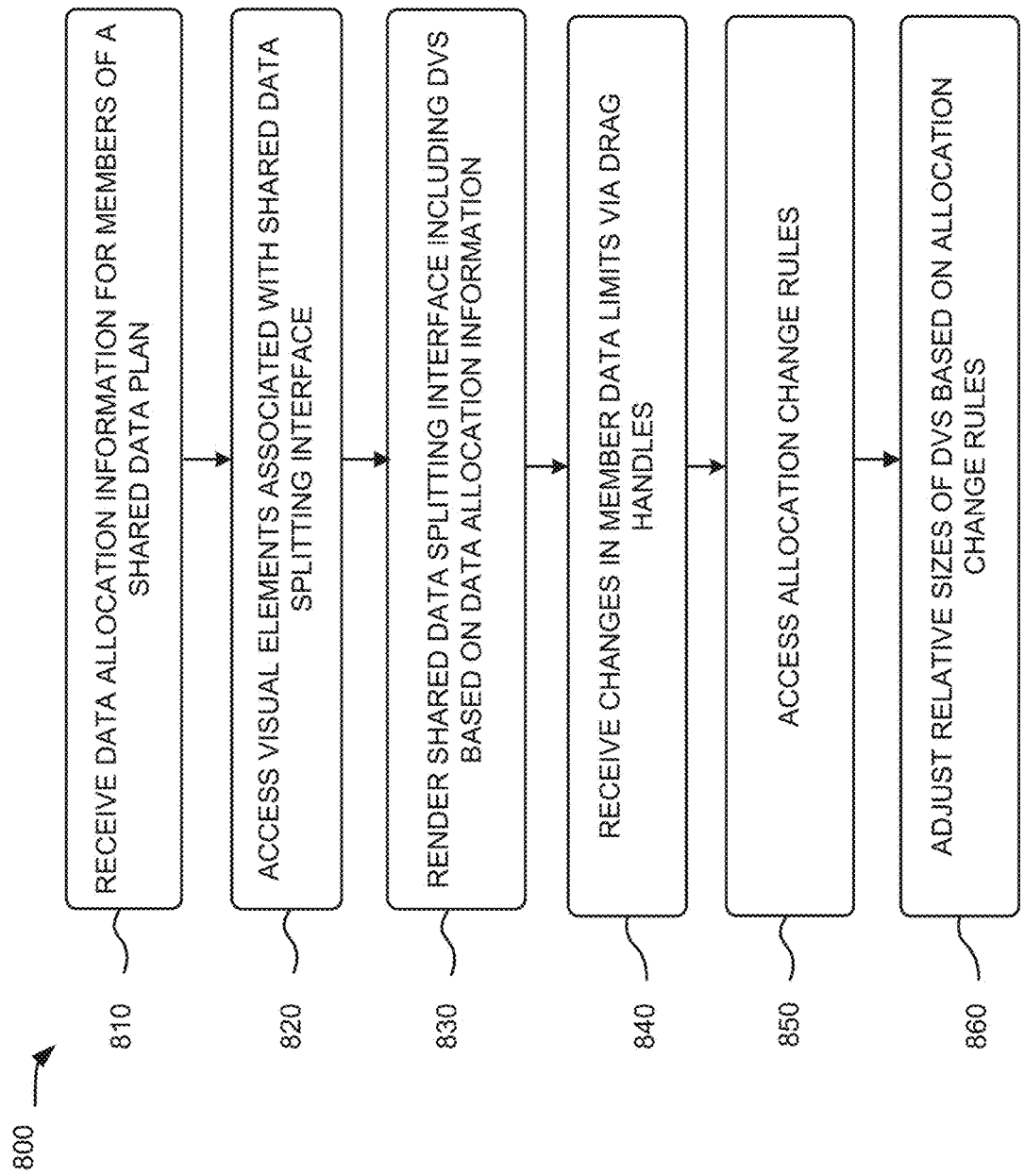

SHARED DATA SPLITTING INTERFACE

BACKGROUND

Computing devices sometimes include a graphical user interface (GUI) that is used to present applications to users. Each application may receive input to provide different functions through different user interface elements displayed in the GUI. In some instances, the computing devices may receive additional input via associated devices, such as sensors, keyboards, computer mice, etc.

The computing devices may consume data when accessing, via a service provider, content servers that are often located in open networks. For example, content may be downloaded from the cloud networks to users' devices. The content may include movies, music, software, etc. Content servers may receive content requests from the computing devices and route the requested content to the computing devices, for example, via wireless networks. Additionally, communications services including voice, video and messaging also consume data resources.

BRIEF DESCRIPTION OF THE DRAWINGS

FIG. 8 is a flow chart of an exemplary process for performing shared data splitting according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide a shared data splitting interface that enables a user to assign a total data allocation for a group (e.g., a family) across various members (i.e., user accounts and associated user devices) within a shared data plan (e.g., a family shared data plan). The shared data splitting interface may allow a user to provide input to divide and adjust the division of data usage limits across various members within the group.

The shared data splitting interface may include a radial distribution component. The radial distribution component may include color coded segments that represent particular member or user devices within the shared data plan. The radial distribution component may access and display data usage and data usage controls that adjust and otherwise affect the relative data allocation between members. The radial distribution component may constantly maintain the relationship of each color coded segment relative to the total data allocation available under the plan. The radial distribution component may also maintain the manner in which the individual segments are inter-related (e.g., the ratios and controlling variables associated with the segments).

Consistent with embodiments, the shared data splitting interface may display the current data consumption within an allocated limit for each user device, which may allow for modification of the allocated limits as deemed fit based on observation of usage patterns. Drag handles may allow a user to modify the data split in a number of ways based on clockwise or anticlockwise movement of the drag handles to adjust the individual member data limits while maintaining the total data allocation. The relative sizes (with respect to each other) of the color coded segments may be adjusted accordingly.

Figure 1:
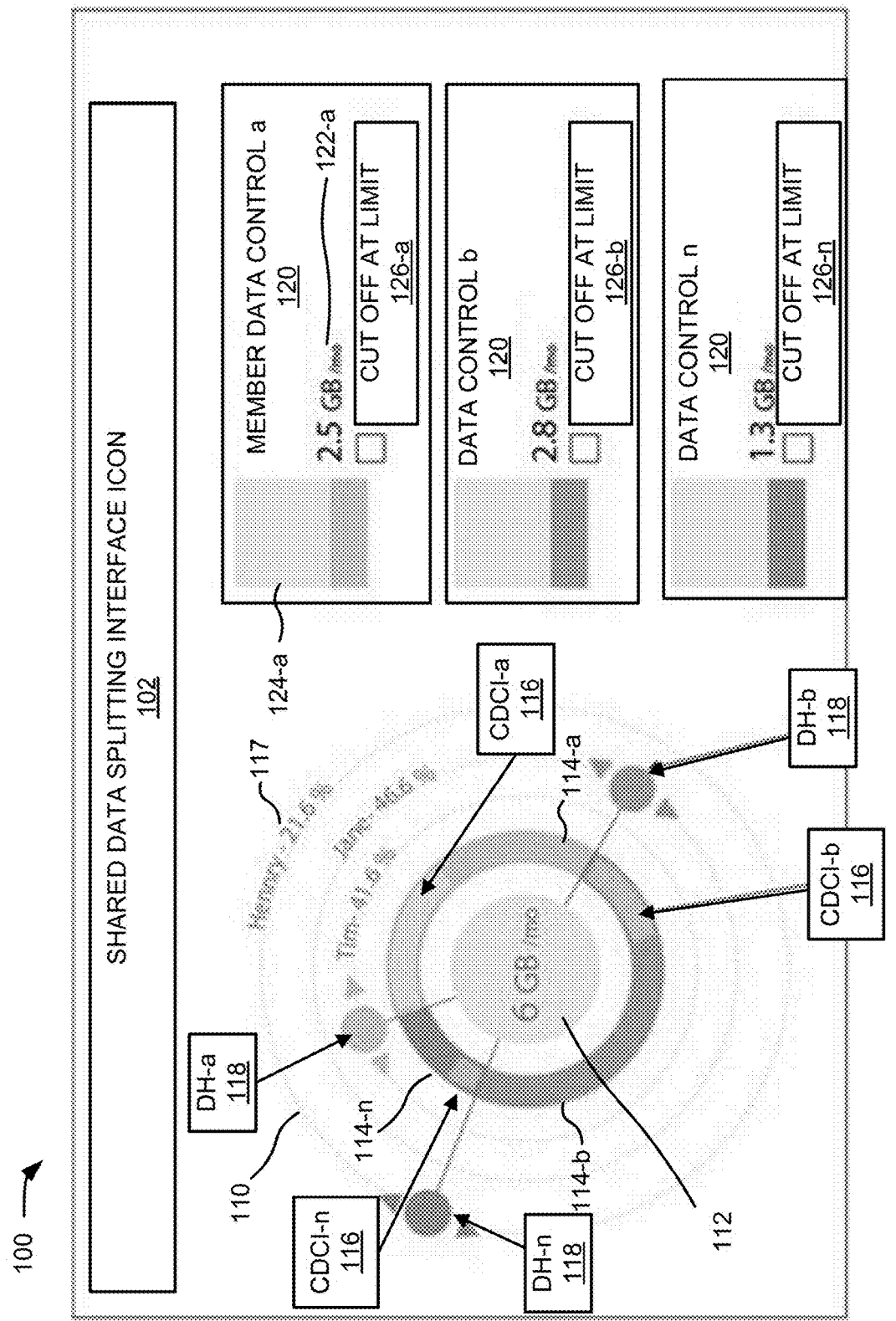
FIG. 1 is a diagram of an exemplary shared data splitting user interface according to an implementation described herein.

FIG. 1 is a diagram of an exemplary shared data splitting user interface 100. As shown in FIG. 1, shared data splitting user interface 100 may include a shared data splitting interface icon 102, a radial distribution component 110 and user device data controls 120 for each member a-to-n of the shared data plan. The particular arrangement and number of components of shared data splitting user interface 100 shown in FIG. 1 are illustrated for simplicity. Shared data splitting user interface 100 may be displayed on a touchscreen (mobile, tablet, etc.) or desktop device such as described with respect to FIG. 2 herein below. The shared data plan may be applicable to different kinds of devices, such as a wearable computing device, a smartphone, a tablet, a personal computer, a sensor, a television, etc. Each of the members of the shared data plan may be associated with a single device, multiple devices or a single user account.

As shown in FIG. 1, shared data splitting user interface 100 may provide a shared data splitting interface that allows input to assign (or split) a total data allocation for a group across various differentiated visual segments 106 corresponding to members within the group (e.g., a family shared data plan). The shared data splitting interface 100 may allow the user to provide input to divide the data usage across various members within the family based on interaction with the shared data splitting user interface 100. Access to different control functions associated with shared data splitting user interface 100 may be determined (or restricted) based on administrative privileges associated with particular users or members within the shared data plan.

Radial distribution component 110 may include a total data allocation 112, differentiated visual segments (DVSs) 114 (shown in FIG. 1 as 114-a to 114-n, corresponding to members of the family plan 1-to-n), current member data consumption indicators (CDCIs) 116 (shown in FIG. 1 as CDCI-a 116 to CDCI-n 116, corresponding to members of the family plan 1-to-n), and drag handles (DHs) 118 for each DVS 114 (shown in FIG. 1 as DH-a 118 to DH-n 118). Radial distribution component 110 may represent different values at different radii from the center of the circle. For example, the DVSs 114 in FIG. 1 represent data consumption. In alternative embodiments (not shown), additional segments at different radii (e.g., at a greater or lesser radius than the DVSs 114) may represent additional values such as roll over data, current payment information (e.g., segmented pay information, such as payments by each member of the group), international data, text messages, etc. Radial distribution component 110 may constantly maintain the visual relationship of a part to the whole and the way in which the individual segments are inter-related. Radial distribution component 110 may allow the user to provide input to divide the data usage across various members within the family.

Total data allocation 112 may represent the total data allotment in the shared data plan for the entire group (e.g., family, business group, etc.). For example, a particular amount of data may be allocated on a monthly basis to the group (e.g., 6 gigabytes (GBs) as shown in FIG. 1). A service provider may monitor data usage and provide feedback regarding current data usage to a device associated with shared data splitting user interface 100.

DVSs 114 may include color coded segments (e.g., purple, orange and green donut segments) may represent members within the shared data plan. Alternatively, DVSs 114 may include segments that are visually differentiated based on other visual factors, such as pattern, brightness, etc. In some implementations the segments associated with members may be represented by non-visual elements, such as haptic or tactile indicators (e.g., braille) of the current data allocation associated with each particular member. The area of each of the DVSs 114 may represent the relative data allocation associated with each particular member of the shared data plan. The data allocation for each particular member may correspond to a single device or multiple devices associated with the particular member.

DVSs 114 may include CDCIs 116 that provide a visual indication of the current data consumption for each member of the shared data plan. DVSs 114 may be visually represented as donut segments. CDCIs 116 may show the current data consumption within the allocated limit for each member as a portion of the allocated data limit. For example, the consumed data portion may be indicated based on a different color or pattern within the allocated data limit. CDCIs 116 may allow the user to modify the limits for members of the shared data plan based on observation of usage patterns for the members with respect to the shared data plan and other members. Additionally, DVSs 114 may include text data limit indicators 117 (e.g., a decimal representation of the allocated amount and an accompanying name of the member or device). The relative sizes and visual composition of the DVSs 114 and CDCIs 116 may provide visual feedback of how a particular member's limit compares to the data limits of the other members and how modifying a particular limit (e.g., of the members of the total data allocation limit) may impact the data allocated to the other members of the shared data plan. For example, CDCI-n 116 may include a portion of the DVS-n 112 that represents the remaining allotment in a bright color while the used allotment may be represented in a darker shade of the color corresponding to the member within a segment (e.g., light blue and dark blue).

DHs 118 (shown in FIG. 1 as DH-a 118 to DH-n 118) may allow the user to modify the data split in a number of different ways. For example, the user may provide input to move DH 118 associated with a DVS 114 for a particular member and the corresponding change in the limit may be offset by a change to the limits for one or more members of the group. Each drag handle 118 and corresponding CDCI 116 (e.g., donut segment) may represent a member. CDCIs 116 and text data limit indicators 117 may be adjusted dynamically based on movement of DHs 118. In a scenario in which the area of the DVS 114 and corresponding limit is reduced, the balance may be distributed proportionately across the remaining members of the shared data plan (e.g., two remaining users). Alternatively, the redistribution of the remaining balance may be custom configured or reassigned based on ratios input by the user or administrator. For example, a default allocation of equal amounts may be adjusted so that a particular member may be allocated twice the amount of data compared to another user as the remaining balance is reassigned. In another example, the reassigned amount to a particular user may be capped or cut off at a particular threshold.

According to an embodiment as described with respect to FIG. 1, the shared data plan includes members a, b, and c (Also shown in FIG. 1, with radial distribution component 110, as Tim, Jane and Hennry). In one example, interface 100 may receive a user input to drag DH-b 118 clockwise around radial distribution component 110. This may decrease Jane's share of the data usage and add the balance to Tim's share (i.e., increased data limit). Alternatively, in instances in which preconfigured data limit linkages are maintained between Tim and Hennry, the share of data that is reduced from Jane may be proportionately split across the data limits (and corresponding DVSs 114) associated with both Tim and Hennry or may be split based on an identified ratio (e.g., ⅔ to Tim and ⅓ to Hennry, etc.). Alternatively, the data limit may be provided based on current or historical consumption statistics.

Member data control component 120 may be displayed for each member of the shared data plan. Each member data control component 120 may include a member data indicator 122, a member data allocation limits 124, a member data limit 126 and member data controls.

Member data indicator 122 may include identifying information associated with a particular member, such as a name, phone numbers and email addresses associated with particular member. Member data control component 120 may provide tools to control individual member data limits including data member data controls 126, which may include a cut off at limit feature that may cut data usage when the member reaches the data limit 124. For example, the user may provide input (e.g., the user may check a box displayed in member data control component 120) to provide an instruction to cut off data to associated devices at the member data limit (or alternatively, slow data usage when approaching the limit). Member data control component 120 may provide additional tools and capabilities, such as additional data for each member that may be assessed separately, individual data use notifications, and other features based on individual preferences. The member data control component 120 may include a notification element that allows the user to indicate at what percentage of use they are to be notified.

In implementations described herein, a shared data splitting interface may provide tools for a user to share data across members via an interface that represents the data associated with each member relative to each of the other members of a shared data plan.

Figure 2:
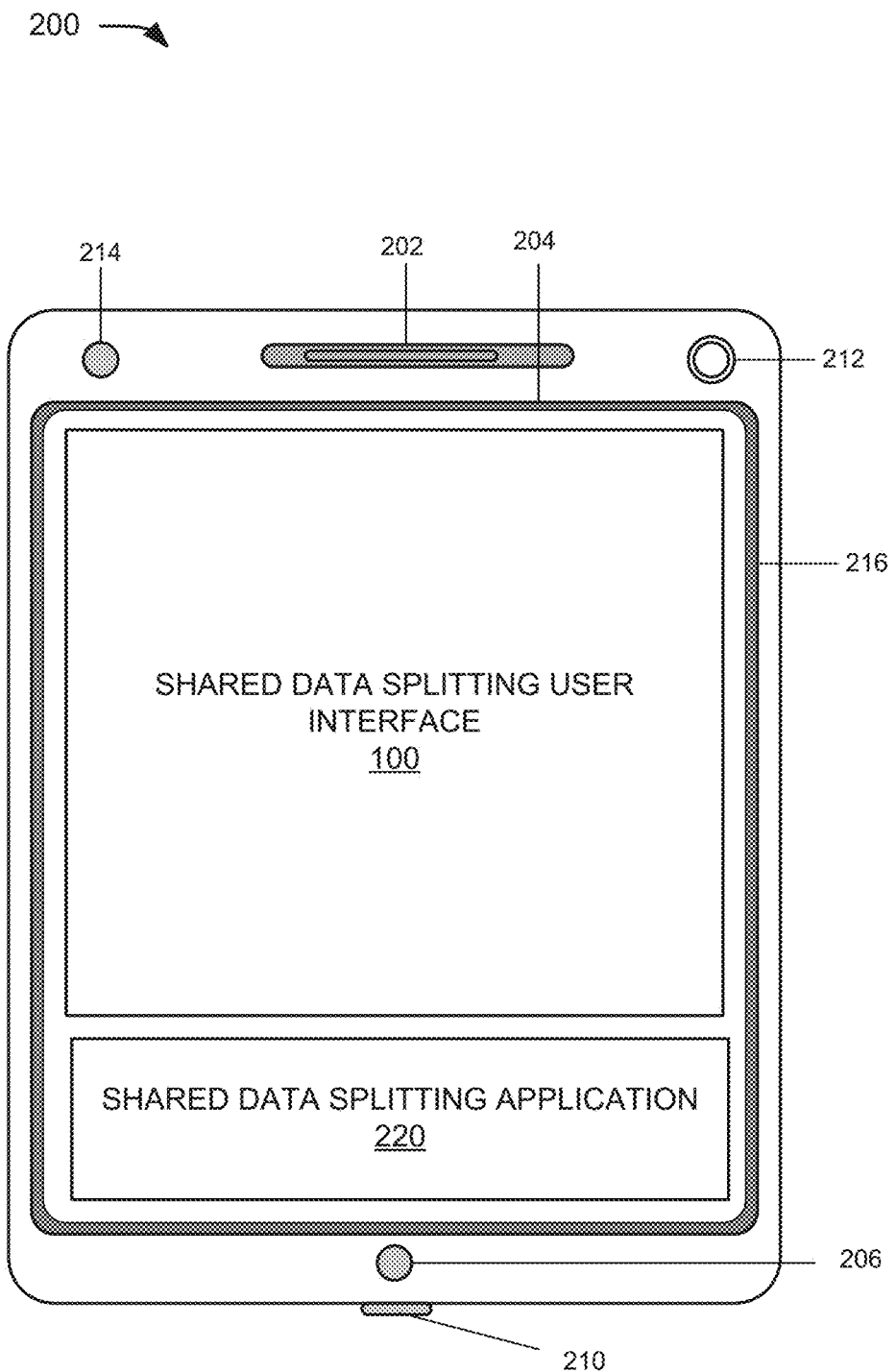
FIG. 2 is a diagram of an exemplary device in which methods and systems described herein may be implemented.

FIG. 2 is a diagram of an exemplary device 200 in which methods and systems described herein may be implemented. Although illustrated as a tablet or touch screen device, user device 200 may include any of the following devices: an electronic notepad, a tablet computer, a laptop, and/or a personal computer; a personal digital assistant (PDA) that can include a telephone; a mobile telephone; a cellular phone; a personal communications system (PCS) terminal that may combine a cellular radiotelephone with data processing, facsimile, and/or data communications capabilities; a gaming device or console; a peripheral (e.g., wireless headphone); a digital camera; or another type of computational or communication device.

User device 200 may include a speaker 202, a touchscreen display 204, control button 206, a microphone 210, sensors 212, a front camera 214, and a housing 216. Additionally, user device 200 may include a shared data splitting interface application 220 that includes machine readable instructions to generate and support a shared data splitting interface 100, such as shown in FIG. 1, and to communicate with a service provider to support data allocation controls and usage monitoring for a shared data plan based on input provided to the shared data splitting interface 100.

Speaker 202 may provide audible information to a user of device 200. User device 200 may include shared data splitting application 220 as preinstalled machine-readable instructions (e.g., provided by a manufacturer of user device 200). Alternatively, users may download shared data splitting application 220 from a service provider or an associated database. Although device 200 is shown with particular components and a particular configuration, device 200 may include fewer, more or different components, such as additional sensors, input devices, and may include associated devices (e.g., a stylus) etc.

Display 204 may provide visual information to the user, such as an image of a caller, video images, or pictures. In addition, display 204 may include a touchscreen for providing input to device 200. Display 204 may provide hardware/software to detect the coordinates of an area that is touched by a user. For example, display 204 may include a display panel, such as a liquid crystal display (LCD), organic light-emitting diode (OLED) display, and/or another type of display that is capable of providing images to a viewer. Display 204 may include a transparent panel/surface for locating the position of a finger or an object (e.g., stylus) when the finger/object is touching or is close to display 204.

Control button 206 may permit the user to interact with device 200 to cause device 200 to perform one or more operations, such as place or receive a telephone call, input data to device 200, manipulate user interface elements, etc. In some implementations, control button 206 may include a telephone keypad (not shown) or an alphanumeric keyboard. Microphone 210 may receive audible information from the user. Sensors 212 may collect and provide, to device 200, information (e.g., acoustic, infrared, etc.) that is used to aid the user in capturing images or in providing other types of information (e.g., a distance between a user and device 200). Front camera 214 may enable a user to view, capture and store images (e.g., pictures, video clips) of a subject in front of device 200. Housing 216 may provide a casing for components of device 200 and may protect the components from outside elements.

In implementations described herein, user device 200 may allow a user to access a shared data splitting interface to split total data across various members within a family shared data plan. The shared data splitting interface may allow a user to divide data usage across various members within the family.

Figure 3:
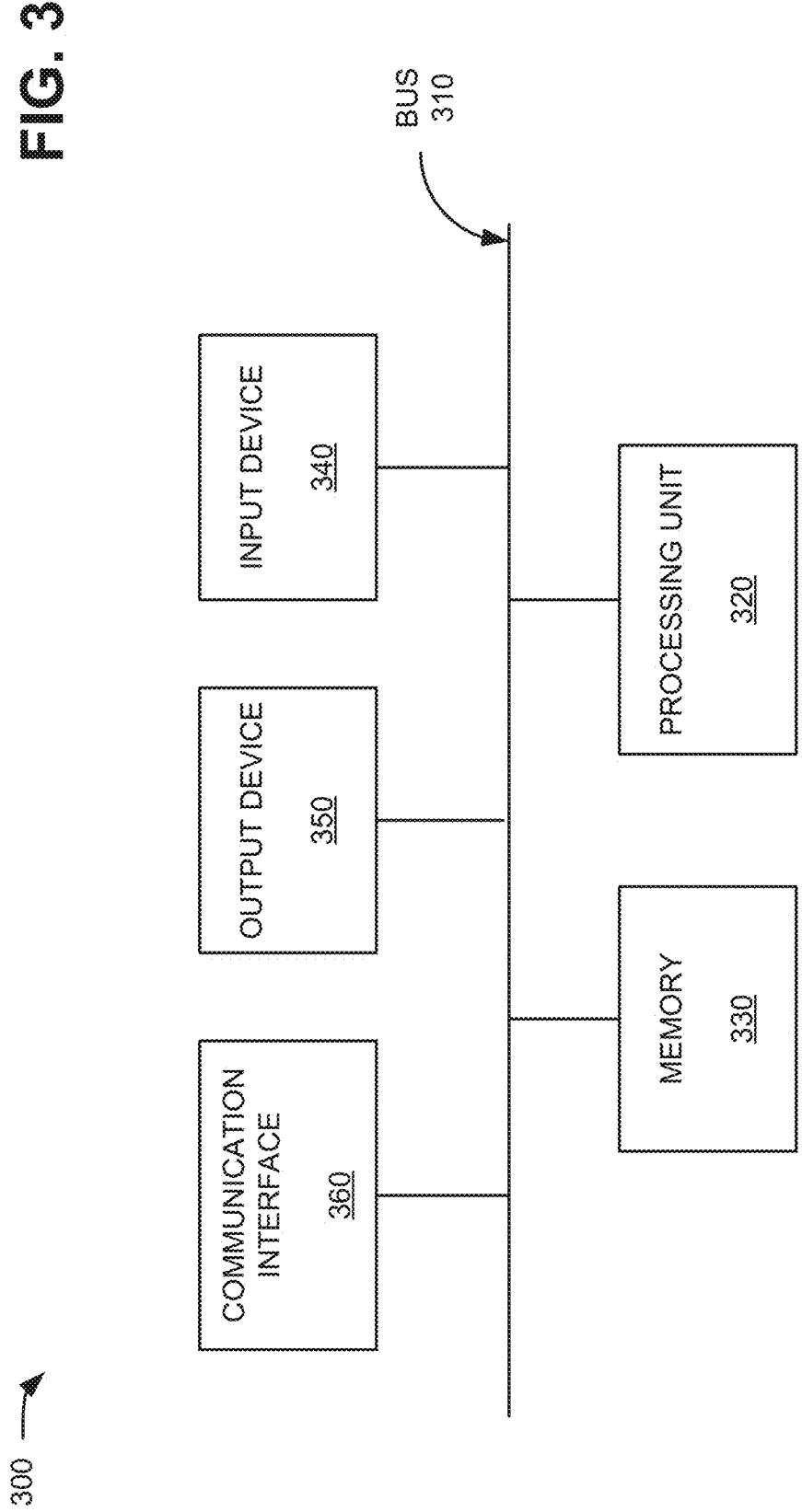
FIG. 3 illustrates an exemplary configuration of one or more of the components of FIG. 2.

FIG. 3 is a diagram of example components of a device 300. User device 200 as described in FIG. 2 above may include one or more devices 300. As shown in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, haptics, etc.

Communication interface 360 may include a transceiver that enables device 300 to communicate with other devices and/or systems. For example, communication interface 360 may include mechanisms for communicating with other devices, such as other devices of network 100.

As described herein, device 300 may perform certain operations in response to processing unit 320 executing machine-readable instructions contained in a computer-readable medium, such as memory 330. A computer-readable medium may be defined as a non-transitory memory device. A memory device may include space within a single physical memory device or spread across multiple physical memory devices. The machine-readable instructions may be read into memory 330 from another computer-readable medium or from another device via communication interface 360. The machine-readable instructions contained in memory 330 may cause processing unit 320 to perform processes described herein. Alternatively, hardwired circuitry may be used in place of or in combination with machine-readable instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. As an example, in some implementations, output device 350 may not include a display. In these situations, device 300 may be a "headless" device that does not include an output device. Some devices may be machine-to-machine devices (e.g., sensors). Alternatively, or additionally, one or more components of device 300 may perform one or more other tasks described as being performed by one or more other components of device 300.

Figure 4:
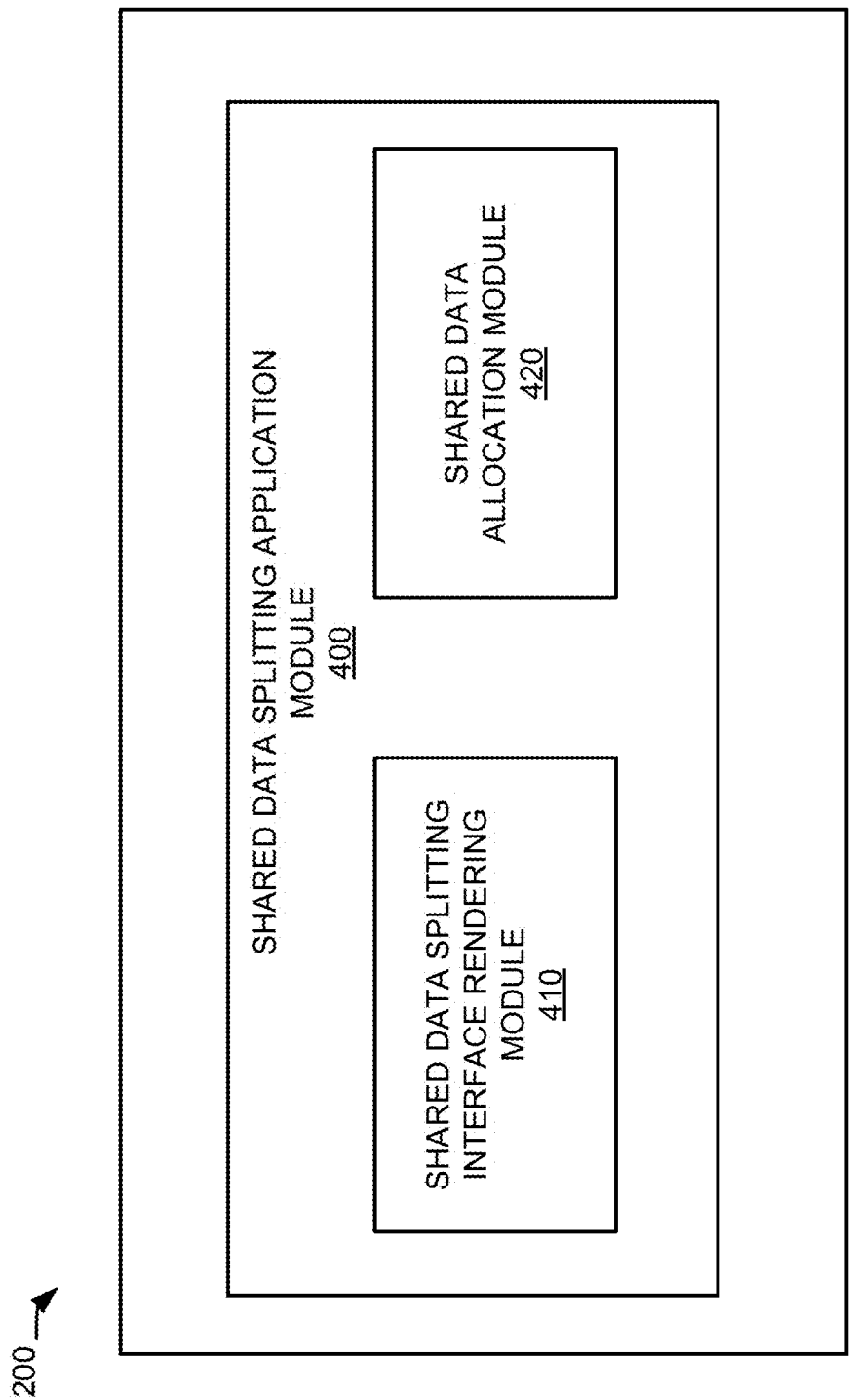
FIG. 4 is a diagram illustrating an exemplary functional block diagram of a user device including a shared data splitting application.

FIG. 4 is an exemplary functional block diagram of a user device 200 including a shared data splitting application module 400 according to an exemplary implementation. User device 200 with shared data splitting application module 400 may include a shared data splitting interface rendering module 410 and a shared data allocation module 420. The logical blocks illustrated in FIG. 4 may be implemented in machine-readable instructions, hardware, or a combination of hardware and machine-readable instructions. For example, in one implementation, all or some of the logical blocks illustrated in FIG. 4 may be implemented by processing unit 320 (FIG. 3) executing machine-readable instructions stored in, for example, memory 330.

Shared data splitting interface rendering module 410 may provide a shared data splitting interface 100 to split total data across various members within a family shared data plan, such as described herein below with respect to FIG. 5. Shared data splitting interface 100 may allow the user to divide data usage across various members within the group or family. Shared data splitting interface 100 may include radial distribution component 110 with DVSs 114 (e.g., color coded segments or donut segments) that may represent members within the shared plan. Shared data splitting application 220 may receive input via radial distribution component 110 and constantly maintain the relationship of each DVS 114 to the total data allotment. The relationship of DVSs 114 to each other may provide a visual perspective of the usage of data resources. Shared data splitting interface rendering module 410 may provide visual feedback of how a particular individual's data limit compares to the others.

Shared data allocation module 420 may provide back end support for functions executed by shared data splitting application 220 (e.g., in response to input via the shared data splitting interface 100) based on communications with one or more back end servers for a service provider and data transmission network, such as described herein below with respect to FIG. 6. Shared data allocation module 420 may determine data allocation based on input received via shared data splitting interface 100 and transmit the data allocation to a back end server. Shared data allocation module 420 may also receive instructions and notifications (e.g., confirmations, errors, alerts) from the back end servers associated with the service provider.

Figure 5:
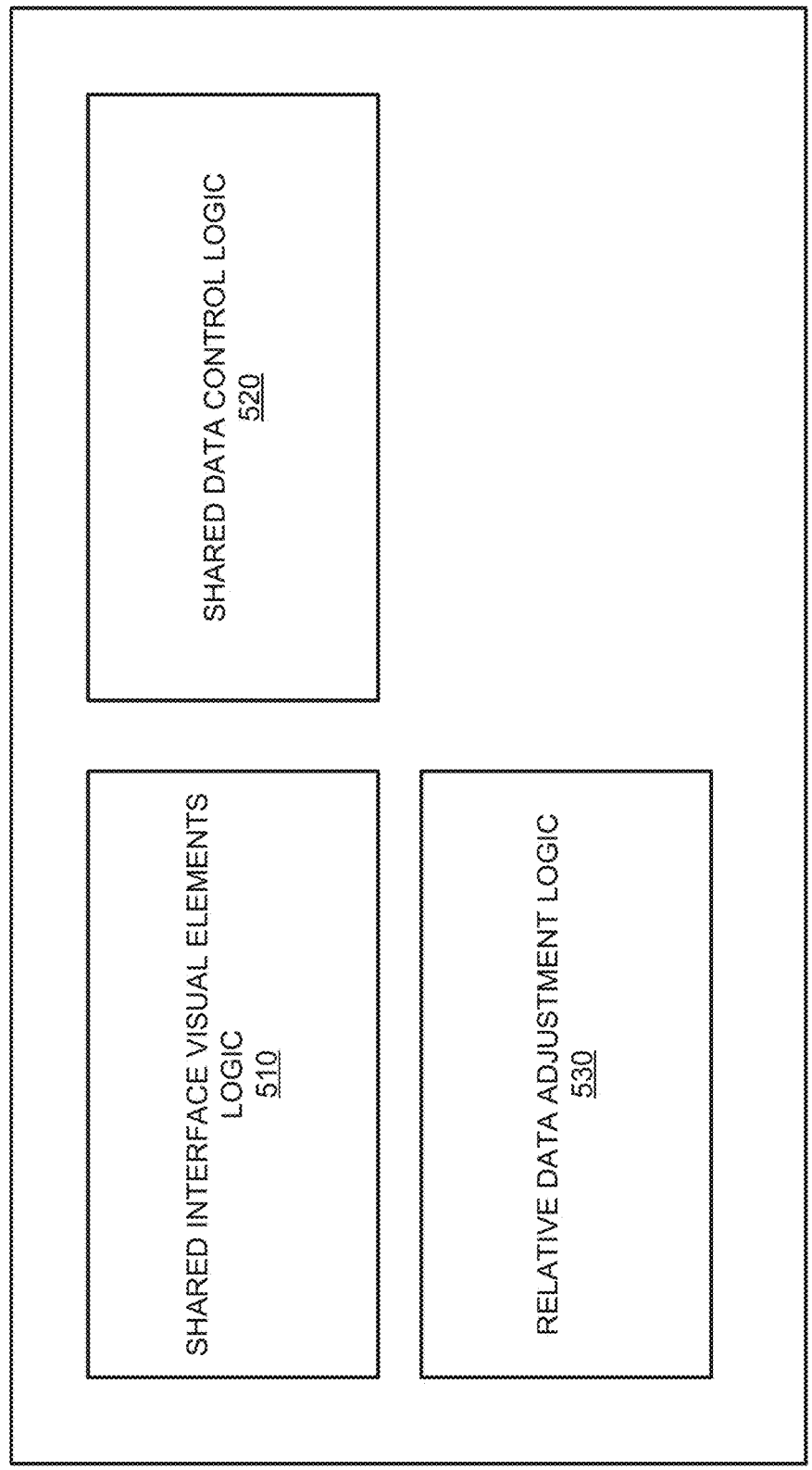
FIG. 5 depicts a functional block diagram of the shared data splitting interface rendering module of FIG. 4.

FIG. 5 is a functional block diagram of a shared data splitting interface rendering module 410. As shown in FIG. 5, shared data splitting interface rendering module 410 includes shared interface visual elements logic 510, shared data control logic 520 and relative data adjustment logic 530. Depending on the implementation, shared data splitting interface rendering module 410 may include additional, fewer, different, or a different arrangement of components than those illustrated in FIG. 5.

Shared interface visual elements logic 510 may identify visual elements associated with particular members of the shared data plan. For example, shared interface visual elements logic 510 may assign particular colors or combination of colors to elements associated with particular members. Shared interface visual elements logic 510 may render graphical elements associated with particular functions (e.g., DHs 118) and corresponding DVSs 114. Shared interface visual elements logic 510 may determine a relative size of each element based on the corresponding data usage and allotment. Shared interface visual elements logic 510 may also provide visual effects associated with notification for members or the entire group (e.g., brighter colors or a particular color to highlight that a member is approaching a threshold of data use). In some implementations, shared interface visual elements logic 510 may render the graphical elements presented in shared data splitting interface 100 based on an identification of a particular member that has accessed shared data splitting interface 100. For example, shared interface visual elements logic 510 may position graphical elements associated with a particular member at a relatively highest (or central) position in shared data splitting interface 100 based on the identified current user (e.g., data allocation of the current user may be emphasized based on position, relative brightness, three-dimensional (3D) offset, etc.).

Shared data control logic 520 may implement calculation of relative data limits and changes to data allocation based on data usage feedback and input provided via radial distribution component 110. Shared data control logic 520 may receive feedback instructions from users to adjust the data limits relative to each member or to the overall group. Shared data control logic 520 may institute caps, thresholds and limits for data usage for individual members or on a group basis.

Relative data adjustment logic 530 may adjust the relative data limits based on instructions via shared data splitting interface 100. Relative data adjustment logic 530, for example, may determine ratios in which data limits are offset between remaining members of the shared data plan when data limits are changed (e.g., via clockwise or anti-clockwise movement of DHs 118). Relative data adjustment logic 530 may manage data distribution based on historical data usage and projected data usage. For example, relative data adjustment logic 530 may provide additional data limits (or increased data limits) based on lower data usage for particular members.

Figure 6:
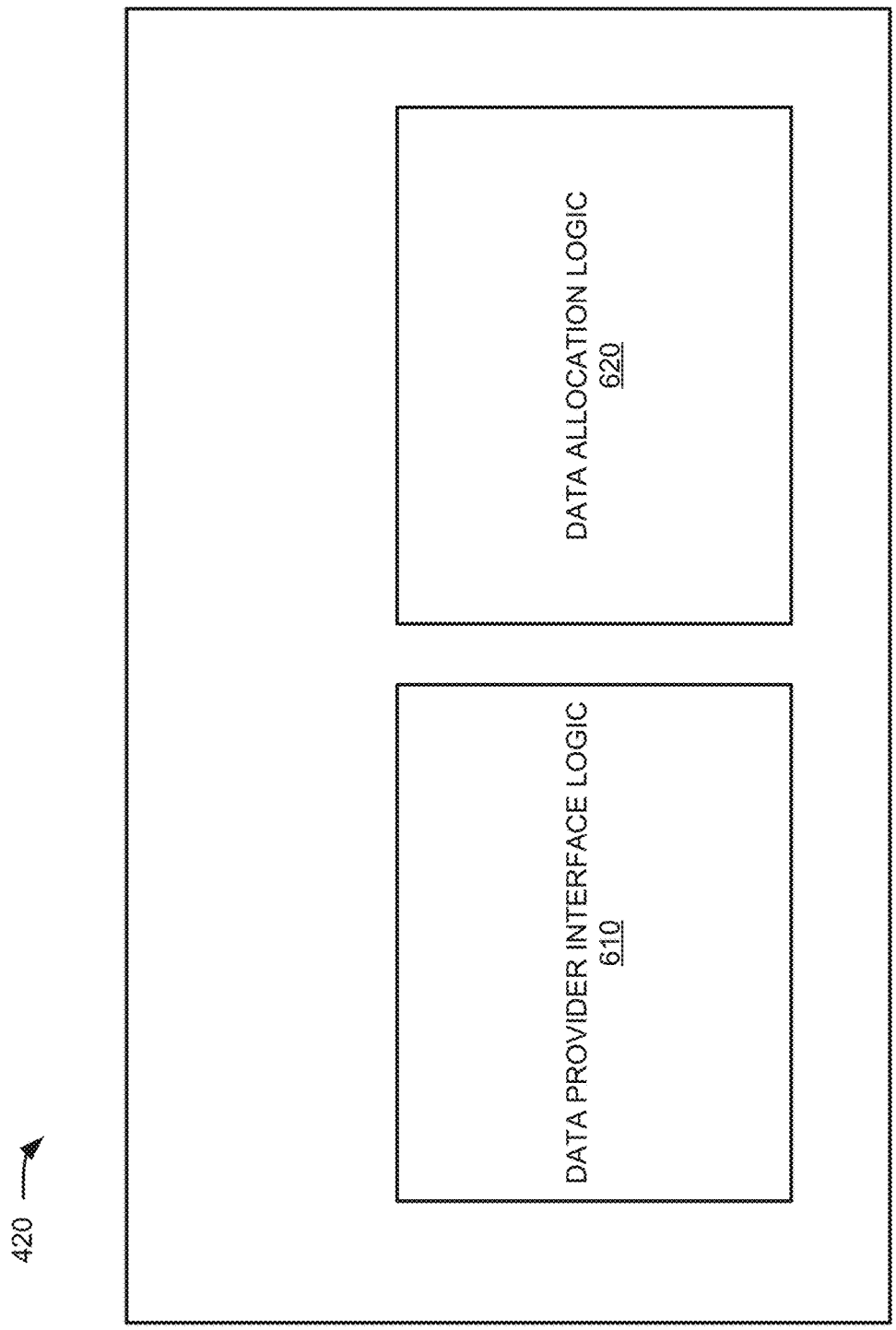
FIG. 6 depicts a functional block diagram of the shared data allocation module of FIG. 4.

FIG. 6 is a functional block diagram of a shared data allocation module 420. As shown in FIG. 6, shared data allocation module 420 includes data provider interface logic 610 and data allocation logic 620. Depending on the implementation, shared data allocation module 420 may include additional, fewer, different, or a different arrangement of components than those illustrated in FIG. 6.

Data provider interface logic 610 may communicate with a service provider (e.g., back end servers associated with a wireless service provider) to manage data thresholds and consumption. For example, data provider interface logic 610 may receive current data consumption statistics associated with members of the group. Data provider interface logic 610 may also receive alerts and billing notifications and transmit adjustments to thresholds which may be forwarded to members via the service provider.

Data allocation logic 620 may determine the allocation of shared data based on member data limits provided by the user and current data consumption statistics. Data allocation logic 620 may determine changes to the member data limits (received via shared data splitting interface 100) and transmit the changes to devices associated with members, for example via a network associated with the service provider.

Figure 7:
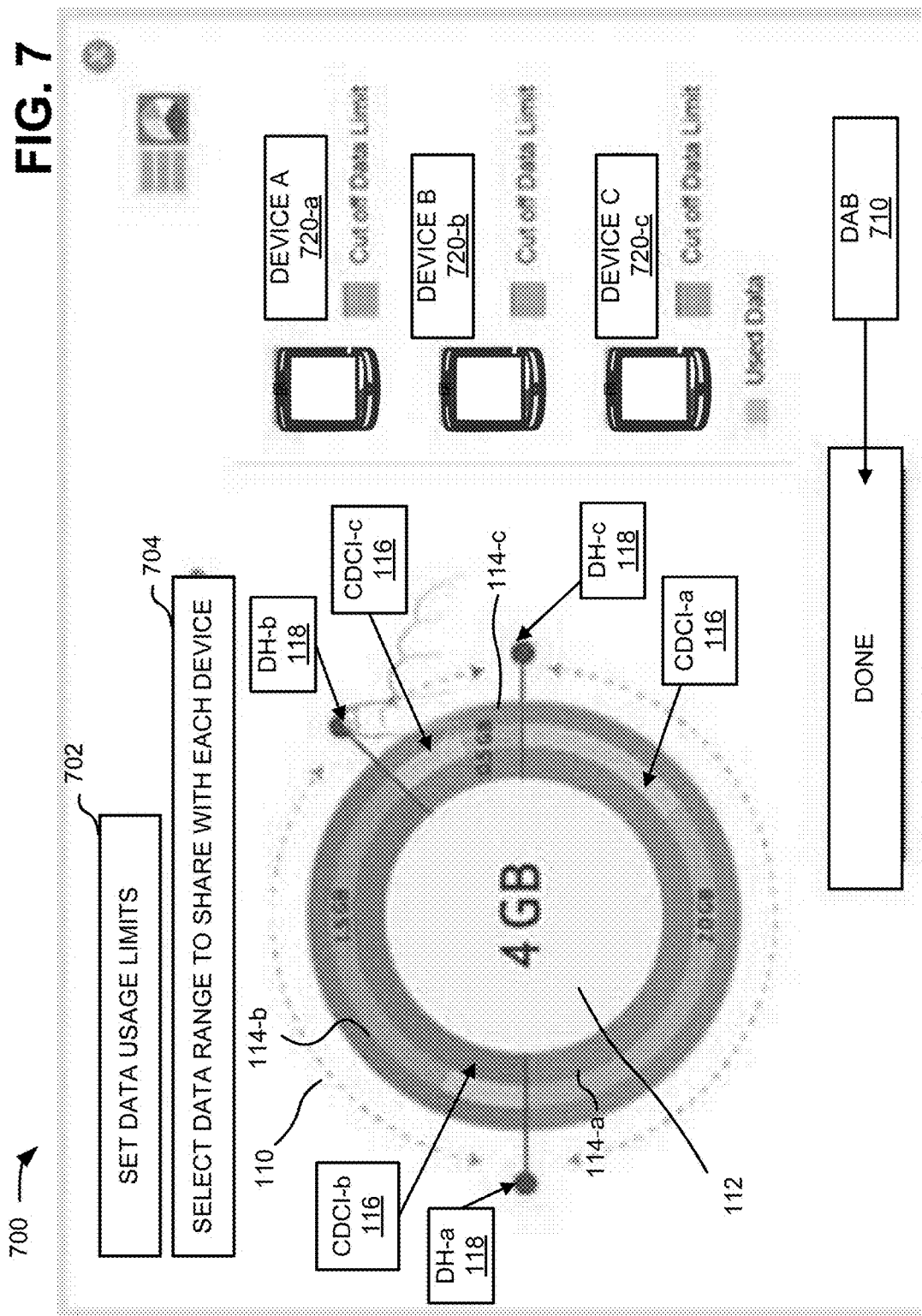
FIG. 7 is a diagram of another exemplary shared data splitting user interface according to an implementation described herein.

FIG. 7 is a diagram of an alternate exemplary shared data splitting user interface 700. As shown in FIG. 7, shared data splitting user interface 700 may include a radial distribution component 110, a data adjustment button 710 (shown in FIG. 7 as DAB 710) and device data controls 720 for each device (shown as devices A, B and C) of the shared data plan. The particular arrangement and number of components of shared data splitting user interface 100 shown in FIG. 7 are illustrated for simplicity.

Data usage limit control component 702 may allow the user to set data limits for each of the members. For example, the user may provide an input to select the set data usage limits graphical elements and a range of interactive options may be provided. Data range control component 704 may allow the user to select a data range to share with each device.

Radial distribution component 110 may include a total data allocation 112, DVSs 114 (shown in FIG. 1 as 114-a to 114-n, corresponding to devices associated with a particular account, designated as 1-to-n), CDCIs 116 (shown in FIG. 1 as CDCI-a 116 to CDCI-c 116, corresponding to devices associated with a shared data plan), and DHs 118 for each DVS 114 (shown in FIG. 7 as DH-a 118 to DH-c 118).

FIG. 7 illustrates an alternative embodiment of DVSs 114 in which a central usage band within each DVS 114 displays the current consumption CDCIs 116. Different colors and indicia may be used for central usage which may correspond to a uniform color across all devices or a variation within the DVSs 114.

Data adjustment button 710 may allow the user to transmit changes in the data limits to a back end server associated with a service provider. Data adjustment button 710 may be selected to set or submit particular device data limits based on adjustment to the position of the DHs 118.

Device data controls 720 may provide data controls for each device. In one example, a single user may have multiple associated devices which the user may allocate different data limits. For example, the user may allocate a particular data limit to a particular device based on data requirements associated with content that the user intends to view at a later time within a current billing cycle.

FIG. 8 is a flowchart of an exemplary process 800 for performing shared data splitting via a shared data splitting interface according to implementations described herein. Process 800 is described with respect to user device 200 including shared data splitting application 220 shown in FIG. 2, for illustrative purposes. In one implementation, process 800 may be performed by user device 200 including shared data splitting application 220. In another implementation, some or all of process 800 may be performed by another device or group of devices, including or excluding user device 200 including shared data splitting application 220.

User device 200 (that includes shared data splitting application 220) may receive data allocation information associated with a shared data plan and members of the shared data plan (block 810). For example, user device 200 may connect to a back end server that may provide the information regarding the data allocated under the shared data plan. User device 200 may also receive current consumption information associated with each of the members of the shared data plan.

At block 820, user device 200 may access visual elements associated with functions, elements and components of a shared data splitting interface 100. For example, user device 200 may access graphical elements stored on user device 100 or retrieved from the service provider via a computer network.

User device 200 may render shared data splitting interface 100 based on the allocation of data, relative limits associated with the members, and current usage statistics associated with the members (block 830). For example, user device 200 may compose shared data splitting interface 100 based on instructions that describe each of the graphic elements of shared data splitting interface 100, including radial distribution component 110, DVSs 114, CDCIs 116, and DHs 118. User device 200 may determine the relative size of DVSs 114 based on member data limits. User device 200 may determine differentiated visual segments of the radial distribution component 110 for each of members of the shared data plan.

User device 200 may receive changes to the data allocation associated with a particular member (block 840). For example, user device 200 may receive a change in the data allocation based on user manipulation of the DH 118 associated with the particular member's data limit and corresponding DVS 114.

User device 200 may identify allocation change rules (block 850). For example, user device 200 may access allocation change rules that may specify the proportion in which member data limits are to be changed to offset the change in particular member data limits. The allocation change rules may include minimum and maximum data allocations allowed for each member.

User device 200 may implement a visual change in the DVSs 114 of the other members based on changes in the member data limits of other users in response to the change of particular member's data limit (860). For example, user device 110 may increase areas (i.e., the size of the DVSs 114) associated with each of the remaining members in response to the user moving the DH 118 to reduce the member data limit associated with a particular member. User device 200 may determine a proportionate change in the data limits based on allocation change rules.

Systems and/or methods described herein may allow splitting of shared data associated with a shared data plan via a shared data splitting interface. The systems and methods may provide tools to adjust the relative data limits associated with members of the shared data plan including a radial distribution component, color coded segments associated with each member and drag handles to adjust the data allocation associated with a particular member.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
receiving, by a processing device via a data transmission network and from a network device associated with a service provider, information indicating a total data resources allocation and a data usage limit associated with each member of a plurality of members of a shared data resources plan by the service provider, wherein the data usage limits for the plurality of members sum to the total data resources allocation of the shared data resources plan;
rendering, by the processing device responsive to user input by one of the plurality of members, a shared data splitting interface that includes a radial distribution graphic element comprising differentiated visual segments for each member of the shared data resources plan, wherein a relative size of each of the differentiated visual segments corresponds to the data usage limit, and wherein rendering the radial distribution graphic element for the one of the plurality of members comprises at least one visual effect different to the radial distribution graphic elements for each other member of the plurality of members, wherein the at least one visual effect comprises at least two of: arranging the radial distribution graphic element for the one of the plurality of members in a prominent position, providing a higher level of brightness, or providing a three-dimensional offset;

receiving, via the shared data splitting interface, a change in the data usage limit for a first member of the plurality of members of the shared data resources plan responsive to user interaction with a first differentiated visual segment;

adjusting, by the processing device, the relative size of the first differentiated visual segment for the first member based on the change;

correspondingly adjusting, by the processing device, the relative sizes of the differentiated visual segments for other members of the plurality of members in accordance with modifications of the data usage limits for the other members to offset the change in the data usage limit for the first member to maintain constant the total data resources allocation of the shared data resources plan, wherein the data usage limit for at least one member of the plurality of members remains unchanged, and wherein the modifications are determined in accordance with a historical data resource usage and a projected data resource usage associated with each of the other members under the shared data resources plan;

transmitting, to a user device associated with each of the other members via the data transmission network, the modified data usage limit for the other member;

transmitting, to the network device via the data transmission network, the changed data usage limit and the modified data usage limits; and allocating, by the service provider to the plurality of members, data resources under the shared data resources plan according to the changed data usage limit, the modified data usage limits, and the unchanged data usage limit.

2. The computer-implemented method of claim 1, wherein adjusting the relative size of the first differentiated visual segment further comprises:
receiving an instruction to adjust the relative size via a manipulatable drag handle associated with the first differentiated visual segment.

3. The computer-implemented method of claim 1, wherein the differentiated visual segments include color coded segments having a different color associated with each member of the shared data resources plan.

4. The computer-implemented method of claim 1, further comprising:
maintaining a relationship between each of the differentiated visual segments and the radial distribution graphic element based on the total data resources allocation and the data usage limit associated with each of the plurality of members of the shared data resources plan.

5. The computer-implemented method of claim 4, further comprising:
maintaining an inter-relationship between the differentiated visual segments.

6. The computer-implemented method of claim 1, further comprising:
displaying a current data consumption for each member within the respective differentiated visual segment associated with the member.

7. The computer-implemented method of claim 1, wherein correspondingly adjusting the relative sizes of the differentiated visual segments further comprises:
adjusting the relative sizes of the differentiated visual segments proportionately.

8. The computer-implemented method of claim 1, wherein adjusting the relative sizes of the differentiated visual segments further comprises:
adjusting the relative sizes of the differentiated visual segments based on a predetermined ratio.

9. The computer-implemented method of claim 1, further comprising:
receiving, from the network device via the data transmission network, an instruction to stop providing the data resources in response to the modified data usage limit associated with one of the other members of the shared data resources plan.

10. The computer-implemented method of claim 1, wherein the user devices associated with each of the other members of the shared data resources plan include at least one of a wearable computing device, a smartphone, a tablet, a personal computer, a sensor, or a television.

11. The computer-implemented method of claim 1, wherein the modifications of the data usage limits for the other members are not proportional.

12. A device, comprising:
a communication interface;
a memory to store a plurality of instructions; and
a processor configured to execute instructions in the memory to:
receive, via the communication interface and via a data transmission network and from a network device associated with a service provider, information indicating a total data resources allocation and a data usage limit associated with each member of a plurality of members of a shared data resources plan by the service provider, wherein the data usage limits for the plurality of members sum to the total data resources allocation of the shared data resources plan;
render, responsive to user input by one of the plurality of members, a shared data splitting interface that includes a radial distribution graphic element comprising differentiated visual segments for each member of the shared data resources plan, wherein a relative size of each of the differentiated visual segments corresponds to the data usage limit, and wherein the radial distribution graphic element for the one of the plurality of members is rendered with at least one visual effect different to the radial distribution graphic elements for each other member of the plurality of members, wherein the at least one visual effect comprises at least two of: arranging the radial distribution graphic element for the one of the plurality of members in a prominent position, providing a higher level of brightness, or providing a three-dimensional offset;
receive, via the shared data splitting interface, a change in the data usage limit for a first member of the plurality of members of the shared data resources plan responsive to user interaction with a first differentiated visual segment;
adjust the relative size of the first differentiated visual segment for the first member based on the change;

correspondingly adjust the relative sizes of the differentiated visual segments for other members of the plurality of members in accordance with modifications of the data usage limits for the other members to offset the change in the data usage limit for the first member to maintain constant the total data resources allocation of the shared data resources plan, wherein the data usage limit for at least one member of the plurality of members remains unchanged, and wherein the modifications are determined in accordance with a historical data resource usage and a projected data resource usage associated with each of the other members under the shared data resources plan;

transmit, via the communication interface to a user device associated with each of the other members via the data transmission network, the modified data usage limit for the other member; and transmit, via the communication interface to the network device via the data transmission network, the changed data usage limit and the modified data usage limits to enable the service provider to allocate data resources to the plurality of members under the shared data resources plan according to the changed data usage limit, the modified data usage limits, and the unchanged data usage limit.

13. The device of claim 12, wherein the differentiated visual segments include color coded segments having at least one different color associated with each member of the shared data resources plan.

14. The device of claim 12, wherein the processor is further configured to:

maintain a relationship between each of the differentiated visual segments and the radial distribution graphic element based on the total data resources allocation and the data usage limit associated with each of the plurality of members of the shared data resources plan.

15. The device of claim 12, wherein the processor is further configured to:

display a current data consumption for each member within the respective differentiated visual segment associated with the member.

16. The device of claim 12, wherein, when correspondingly adjusting the relative sizes of the differentiated visual segments, the processor is further configured to:

adjust the relative sizes of the differentiated visual segments proportionately.

17. The device of claim 12, wherein the processor is further configured to:

receive, via the communication interface from the network device via the data transmission network, an instruction to stop providing data resources in response to the modified data usage limit associated with one of the other members of the shared data resources plan.

18. The device of claim 12, wherein, when adjusting the relative size of the first differentiated visual segment, the processor is further configured to:

receive an instruction to adjust the relative size via a manipulatable drag handle associated with the first differentiated visual segment.

19. A non-transitory computer-readable medium including instructions to be executed by a processor, the instructions including one or more instructions, when executed by the processor, cause the processor to:

receive, via a communication interface and via a data transmission network and from a network device associated with a service provider, information indicating a total data resources allocation and a data usage limit associated with each member of a plurality of members of a shared data resources plan by the service provider, wherein the data usage limits for the plurality of members sum to the total data resources allocation of the shared data resources plan;

render, responsive to user input by one of the plurality of members, a shared data splitting interface that includes a radial distribution graphic element comprising differentiated visual segments for each member of the shared data resources plan, wherein a relative size of each of the differentiated visual segments corresponds to the data usage limit, and wherein the radial distribution graphic element for the one of the plurality of members is rendered with at least one visual effect different to the radial distribution graphic elements for each other member of the plurality of members, wherein the at least one visual effect comprises at least two of: arranging the radial distribution graphic element for the one of the plurality of members in a prominent position, providing a higher level of brightness, or providing a three-dimensional offset;

receive, via the shared data splitting interface, a change in the data usage limit for a first member of the plurality of members of the shared data resources plan responsive to user interaction with a first differentiated visual segment;

adjust the relative size of the first differentiated visual segment for the first member based on the change;

correspondingly adjust the relative sizes of the differentiated visual segments for other members of the plurality of members in accordance with modifications of the data usage limits for the other members to offset the change in the data usage limit for the first member to maintain constant the total data resources allocation of the shared data resources plan, wherein the data usage limit for at least one member of the plurality of members remains unchanged, and wherein the modifications are determined in accordance with a historical data resource usage and a projected data resource usage associated with each of the other members under the shared data resources plan;

transmit, via the communication interface to a user device associated with each of the other members via the data transmission network, the modified data usage limit for the other member; and transmit, via the communication interface to the network device via the data transmission network, the changed data usage limit and the modified data usage limits to enable the service provider to allocate data resources to the plurality of members under the shared data resources plan according to the changed data usage limit, the modified data usage limits, and the unchanged data usage limit.

20. The non-transitory computer-readable medium of claim 19, wherein, when adjusting the relative size of the first differentiated visual segment, the one or more instructions further includes instructions to:

receive an instruction to adjust the relative size via a manipulatable drag handle associated with the first differentiated visual segment.

* * * * *